United States Patent [19]

Zeuthen

[11] 4,124,288
[45] Nov. 7, 1978

[54] SCANNING MECHANISM FOR AN ELECTROSTATIC COPIER

[75] Inventor: Karl G. Zeuthen, Gentofte, Denmark

[73] Assignee: Rex-Rotary International Corporation A.S., Birkerod, Denmark

[21] Appl. No.: 759,479

[22] Filed: Jan. 14, 1977

[30] Foreign Application Priority Data

Jan. 19, 1976 [GB] United Kingdom ................. 2016/76

[51] Int. Cl.² ...................... G03G 15/28; G03G 15/32
[52] U.S. Cl. ........................................ 355/8; 355/3 R
[58] Field of Search ............................. 355/3 R, 8, 11

[56] References Cited

U.S. PATENT DOCUMENTS

| | | | |
|---|---|---|---|
| 3,594,079 | 7/1971 | Murgas et al. | 355/8 |
| 3,672,762 | 6/1972 | Suzuki et al. | 355/8 X |
| 3,697,165 | 10/1972 | Morriston et al. | 355/8 |
| 3,877,807 | 4/1975 | Kurita | 355/8 X |
| 3,907,422 | 9/1975 | Eppe et al. | 355/8 |
| 3,990,792 | 11/1976 | Kono et al. | 355/8 |

*Primary Examiner*—Fred L. Braun
*Attorney, Agent, or Firm*—Fleit & Jacobson

[57] ABSTRACT

In a document copier in which forward and reverse travel of a scanning member, preferably a document-carrying carriage moving past a stationary scanning source, is driven in a forward direction by a first drive chain, and entrained for movement in a reverse direction by a second, more rapidly circulating drive chain. The second drive chain is effective also to drive the image-developer unit and the sheet feed system of the copier. In the preferred embodiment, the first drive member is synchronized to circulate at the same speed as the peripheral speed of rotation of the photoconductor drum.

11 Claims, 5 Drawing Figures

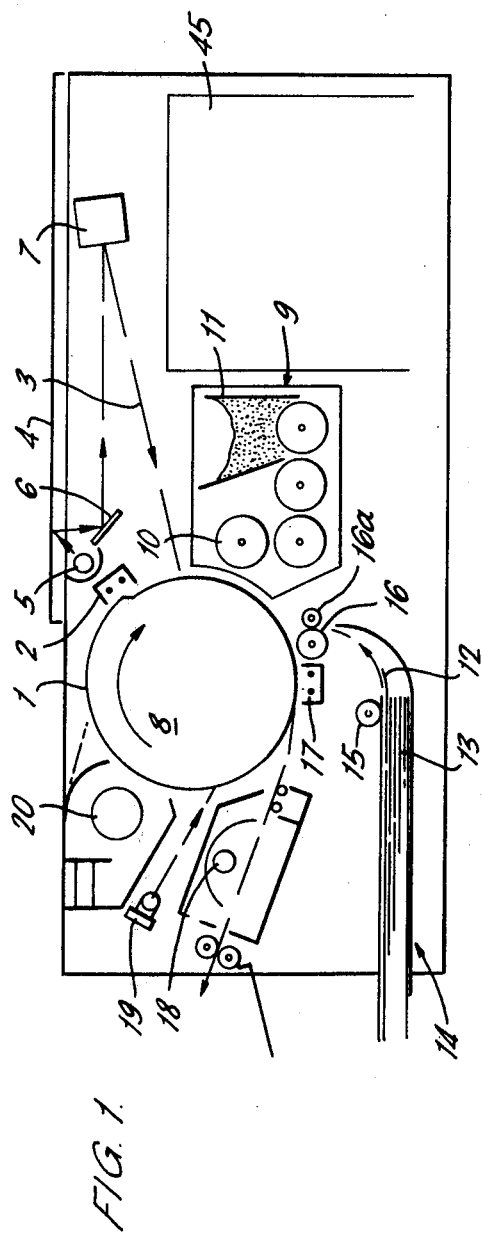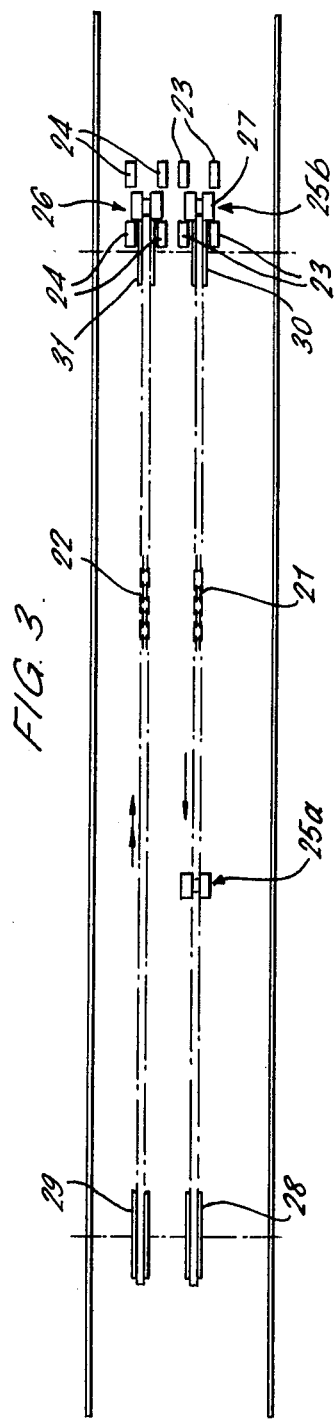

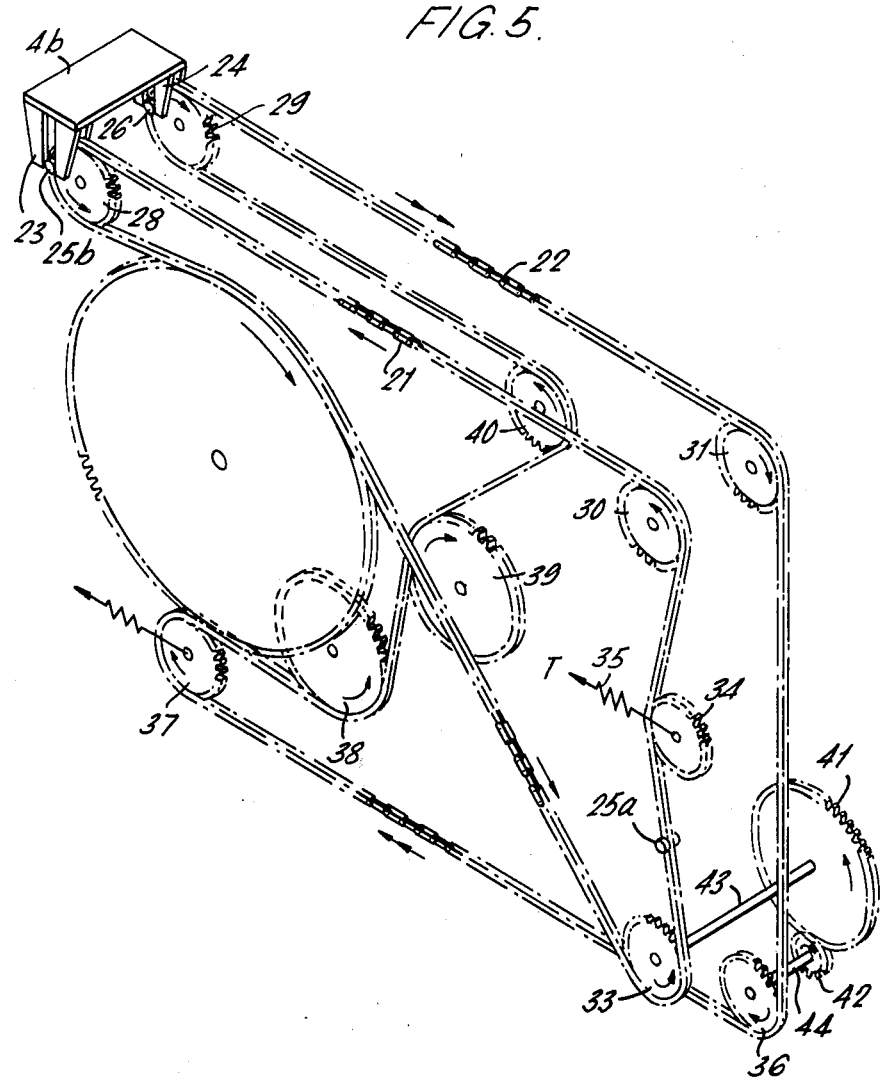

SCANNING MECHANISM FOR AN ELECTROSTATIC COPIER

The present invention relates to a photocopier in which the scanning of the original is carried out by setting up relative movement, along a longitudinal scanning path, between an original document to be scanned, on the one hand, and a scanning slit and lens, on the other hand, so that the movable scanning member executes a "slow out-fast return" movement to be positioned ready for the next cycle.

It is a problem in the designing of the "reciprocable carriage" type of document scanning mechanism, where the carriage may support either the original document or the scanning slit, that transition of the carriage from stationary to moving modes requires the use of either impact-absorbing clutch members which require careful adjustment after prolonged use in order to ensure positive action, or alternatively of a direct drive in which acceleration from the static to the moving mode is harsh and can damage the delicate workings of the copier.

One such system which does not require a shock-absorbing clutch is disclosed in U.S. Pat. No. 3,918,805 where an endless drive member engages a vertical slot on a horizontally moving scanning member to entrain the carriage for forward and reverse strokes.

Where a fast return stroke is required a modification to the above prior art system has been used, for example as disclosed in U.S. Pat. No. 3,635,554 where the endless member only drives the carriage for outward movement, return being initiated by a counter balance weight. In that disclosure entrainment and release of the carriage are both fierce, and a shock absorber is required at the end of the return stroke.

It is desirable to overcome the problems of shock-free acceleration and retardation of the scanning carriage, in the fast return stroke, without the need for shock-absorbing means.

According to the present invention we provide a document copier comprising a scanning member driven for movement to define a scan of an original on a platen, a pair of endless drive members for driving the scanning member along a horizontal scan path, each endless member having a horizontal run parallel to the scan path of the scanning member, the scanning member including two slotted portions each adapted to receive a drive member carried by an associated one of the endless members, one of said endless driving members being driven for constantly circulating motion giving travel along said horizontal run in a forward direction during a copy cycle and the other being driven for constantly circulating motion at a speed higher than that of said one member and in a reverse direction during a copy cycle, and said slotted portions of the scanning member each comprising a slot such that each of the wheels at the ends of the said horizontal run of an endless member has a radius shorter than the length of slot of the associated slotted portion of the scanning member.

Thus as the said endless member moves upwardly around a wheel at the start of its travel along said horizontal run it will enter the slot and will simultaneously entrain the carriage, for acceleration following a quarter wave sinusoidal pattern, and the deceleration of the carriage at the opposite end of the run will simultaneously be according to a sinusoidal quarter wave pattern, much smoother than the fierce engagement by abutment of a constantly moving drive member and stationary carriage in U.S. Pat. No. 3,635,554, on start of scan, and also much smoother at the end of scan.

More conveniently the slower moving "exposure" endless member may carry more drive members than the faster moving member, for example two as compared to one on the faster member.

Preferably the two endless members are both chains positively connected to the drive of the copier. More preferably the chains serve to synchronise operation of the main components of the copier such as the rotation of the photoconductor drum, operation of the primary sheet feed, operation of the secondary sheet feed, operation of the fuser, and operation of a magnetic brush developer roller.

In order that the present invention may more readily be understood the following description is given, merely by way of example, reference being made to the accompanying drawings in which:

FIG. 1 is a side elevational, partly schematic, view of an electrostatographic copier showing the main components of the copier whose exposure carriage is to be driven by the mechanism proposed according to the present invention;

FIG. 3 is a top plan view showing the drive mechanism in the FIG. 2 configuration;

FIG. 5 is another perspective view, corresponding to FIG. 4, but showing the exposure carriage at the end of the exposure movement whereas FIGS. 2 to 4 showed it at the beginning of such a run.

Figure 2:
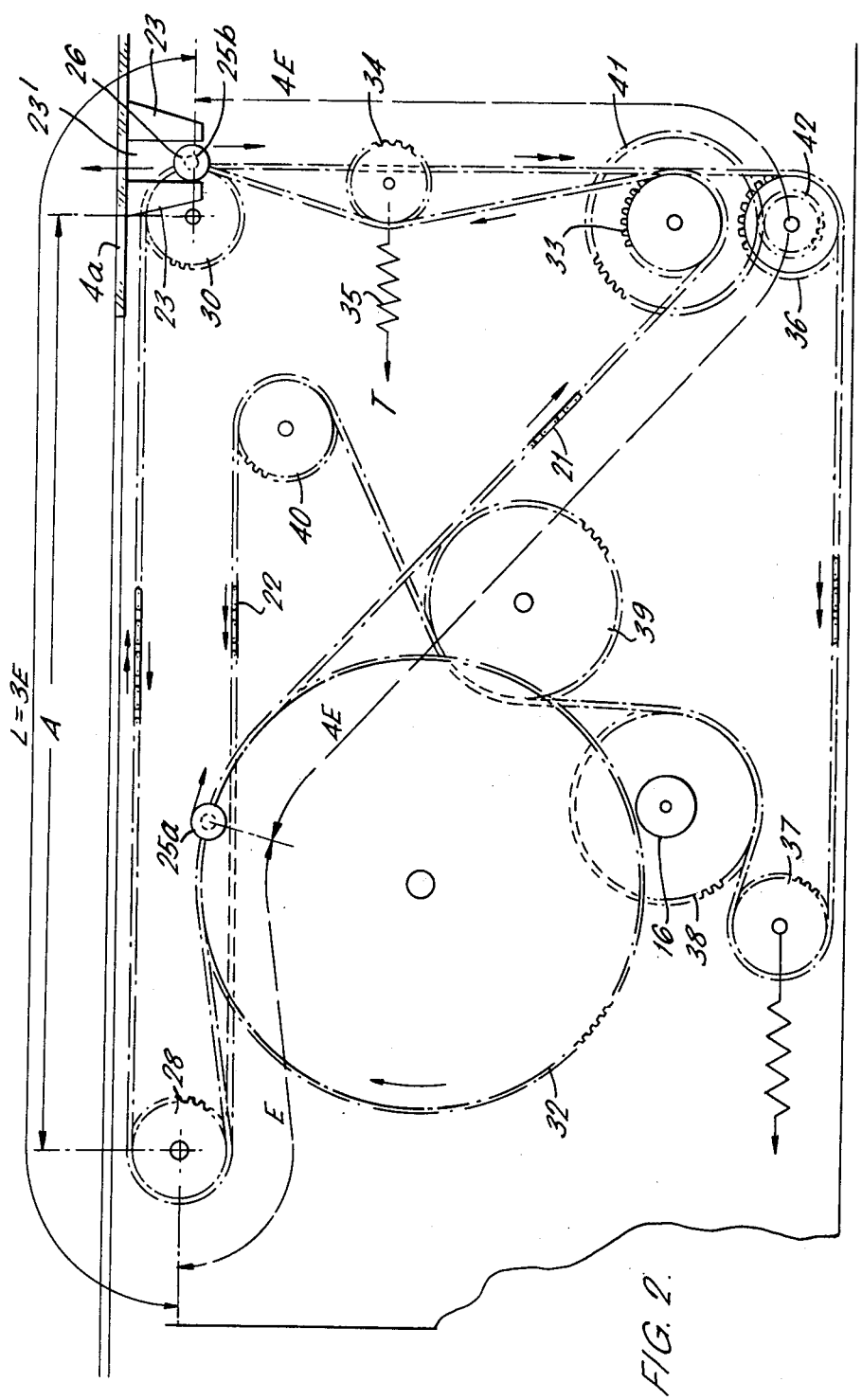
FIG. 2 is another side elevational view showing in detail the drive mechanism for the exposure carriage at the start of a scan cycle.

Referring now to the drawings, and in particular to FIG. 1 which shows the major components of the copier, there is shown the photoconductor drum 1 which has a coating, in this case of zinc oxide, on its peripheral surface. As the drum 1 rotates, its surface becomes charged negatively by the pre-exposure corona charging unit 2 and then exposed to the image-modulated beam 3 of light reflected from the moving original on the exposure carriage 4. The beam 3 is derived from light which has been emitted from the exposure lamp 5, reflected off the original supported on the carriage 4, and then reflected off a mirror 6 onto a mirror lens 7 from which the exposure beam 3 emanates. Somewhere between the exposure lamp 5 and the mirror lens 7 is a slit (not shown) for confining the field of the beam 3.

Downstream from the exposure location, considered in the direction of rotation of drum 1 as indicated by arrow 8, is the developer unit 9 which includes the well known magnetic brush form of toner application member 10. In this way toner from a hopper 11 is applied to the drum surface to develop the latent electrostatic image formed at the exposure location.

The developed image is then picked up by a sheet 12 of plain copy paper from a stack 13 of such sheets in the paper feed unit 14. The top sheet of the stack is separated from the next sheet and advanced by a primary feed roll 15 towards the nip between driving 16 and driven 16a secondary feed rollers which apply the sheet to the surface of the drum 1 on which it is carried to pass between the drum and a transfer corona 17. The charge applied to the sheet of paper by the transfer corona 17 attracts the toner particles away from the drum 1 and onto the paper so that the paper can then pass through the fuser 18 and into a delivery tray.

Once the image-bearing copy sheet has been removed from the drum and fed towards the fuser, the continued rotation of the drum brings that particular part of the drum surface into register with a drum discharge lamp 19 which floods the drum with radiation to obliterate the latent electrostatic image remaining on the photoconductive surface layer of the drum.

Any surplus toner particles are then removed mechanically by a cleaning brush 20 and then, possibly with the aid of electrostatic action, e.g. triboelectric charging, the particles are removed from the bristles of the brush.

Figure 4:
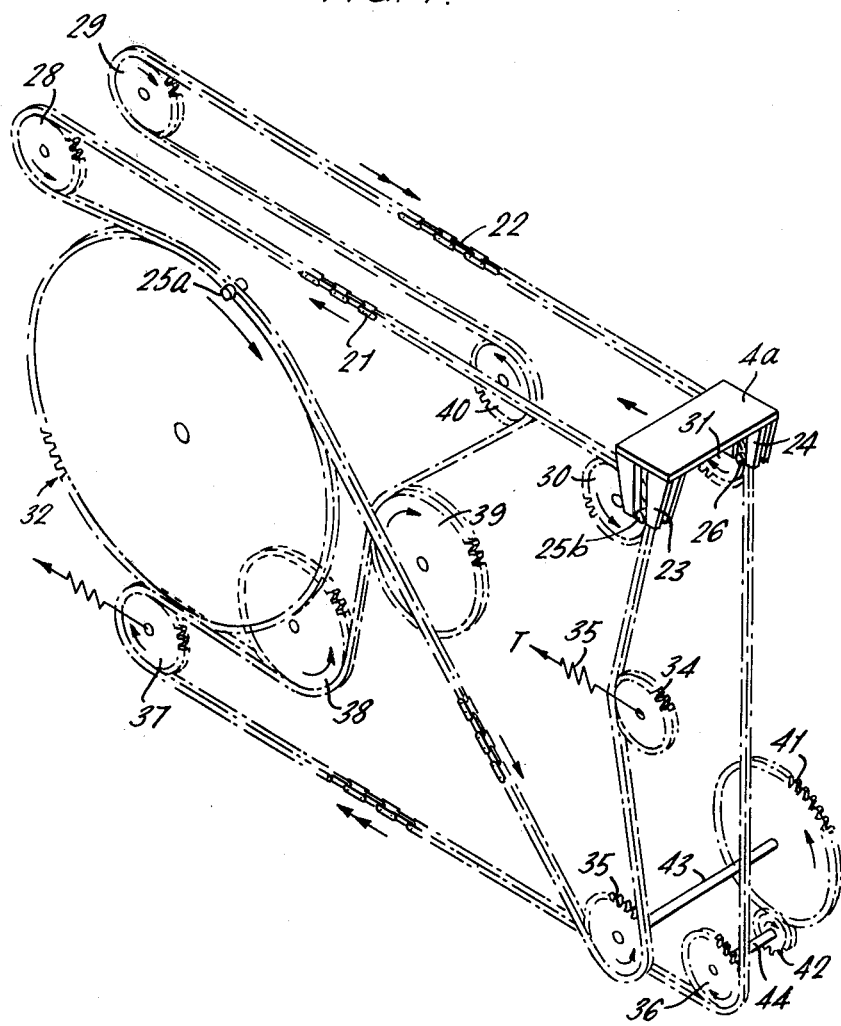
FIG. 4 is a perspective view of the exposure carriage drive in the FIG. 2 configuration.

FIGS. 2 to 5 show that there are two distinct chain drive systems using chains 21 and 22, chain 21 denoted by a single arrowhead being part of a slow speed drive for moving the exposure carriage 4 in a leftward direction from the position 4a in FIGS. 2 and 4 to the position 4b in FIG. 5. The chain 21 carries two equally spaced drive members 25a and 25b for engaging the carriage 4.

Chain 22 is part of a "fast-return" drive system having two arrowheads throughout and is intended to power the exposure carriage 4 in the "fast-return" mode at the end of an exposure cycle in order to ensure rapid return of the carriage to its starting position 4a prior to the next copying operation. The chain 22 carries a single drive member 26.

As shown in FIG. 3, the underside of the carriage 4 includes two brackets 23 and 24 of which only the front bracket 23, is shown in FIG. 2. The two brackets are, as shown in FIGS. 3 to 5, laterally spaced such that the drive member 25a or 25b of chain 21 will engage in a slot 23' in the front bracket 23, and the single drive member 26 of chain 22 will engage in a slot 24' in the rear bracket 24.

Each of the drive members 25a, 25b and 26 consists of a pin passing through the chain and carrying at its ends two freely rotatable rollers 27.

As shown in FIG. 3, at the left-hand end of the electrostatographic copier are two laterally spaced coaxial chain wheels 28 and 29 only one of which, chain wheel 28, can be seen in FIG. 2. At the other, i.e., the right-hand, end of the copier underneath the starting position 4a of the exposure carriage 4 are two further chain wheels 30 and 31, respectively, the chain wheel 30 disposed in front of chain wheel 31 therefore being alone visible in FIG. 2.

It will be appreciated that the front chain wheels 28 and 30 support the chain 21 of the slow speed transmission system while the rear chain wheels 29 and 31 support the chain 22 of the "fast-return" transmission system.

The slow speed "exposure" transmission chain 21 passes from the chain wheel 28 to a toothed peripheral portion 32 of the photoconductor drum of the copier and from there onto a lower driving chain wheel 33 directly below the right-hand front upper chain wheel 30. The circulation path of the chain 21 is then completed by an upwardly directed run passing over a chain tensioning sprocket 34 spring biased by a tension coil spring 35 to exert a lateral force T on the chain 21.

During one cycle of operation of the copier the drive member 25b of the "exposure" transmission chain 21 starts from the position illustrated in FIGS. 2 and 4, just beneath the front bracket 23, and then passes upwardly and around the periphery of chain wheel 30 and horizontally along the upper run of the chain 21 to pass downwardly and around the left-hand upper chain wheel 28 during a first "exposure" part of the operating cycle to end up in the configuration shown in FIG. 5.

The exposure carriage 4 is then driven for return movement by means of drive member 26 of the "fast-return" transmission chain 22 while the "exposure" transmission chain 21 continues circulating its drive member 25b to the position 25a shown in FIGS. 2 and 4.

During the next complete copy cycle the drive member 25b passes from the position 25a of FIGS. 2 and 4 back to the position 25b of those Figures by way of the toothed portion 32 of the drum 1, the lower righthand chain wheel 33 and the tensioning sprocket 34.

The chain 22 of the "fast-return" transmission system has a longer closed path which (as viewed in FIG. 2) extends from the rear lefthand chain wheel 29 horizontally along to the rear righthand chain wheel 31, down to a bottom righthand rear driving chain wheel 36 which is at a level below the bottom righthand front chain wheel 33 and then leftwardly along a horizontal run to the bottom lefthand chain wheel 37. From the chain wheel 37 the chain 22 passes around a large diameter chain wheel 38 then upwardly onto a second large diameter chain wheel 39 about which the chain passes on its way to a smaller diameter chain wheel 40 round which it passes before entering the horizontal run back to the underside of the lefthand rear chain wheel 29.

Synchronisation between feeding of the plain paper sheets 12 from the feeder 14, application of the sheets onto the drum 1, and the operation of the magnetic brush developer 10 is all achieved by virtue of the same highspeed transmission chain 22 shown in FIGS. 2 to 5. To this end the driving secondary feed roll 16 of FIG. 1 (also shown in FIG. 2) is fast for rotation with the chain wheel 38, and the chain wheel 39 is connected to the magnetic brush developer roller 10.

The chain wheel 37 is spring biased leftwardly in FIGS. 2, 4 and 5 to maintain the required tension in the highspeed transmission chain 22.

The drive to the two chains 21 and 22 comes from chain wheels 33 and 36 which are each on common shafts 43, 44 respectively, with respective constantly meshing pinions 41 and 42 whose diameters are related to the lengths of the chains and to the spacing between the various, in this case two, drive members 25a, 25b on chain 21 so that the chains circulate at speeds such that in one complete copy cycle the drive member 26 of chain 22 completes one circuit of the machine and each drive member on the chain 21 advances by one step to occupy the position previously filled by the preceding element by virtue of the fact that their speed are different and so also are the path lengths, i.e., the respective chain lengths.

Although in the presently described embodiment the drive is applied to the chain 21 and 22 by way of their respective bottom right hand drive wheels 33 and 36, drive may instead be applied to one or more of the chain wheels in each chain path by means of appropriate gearing to give the desired ratio of chain circulation speeds.

Control of the stopping and starting of the two chains 21 and 22 will, like control of all of the other components of the copier, be controlled from the control unit 45 in FIG. 1.

From the above, it will be appreciated that the two chains provide, between them, a means of synchronising the operation of the main components of the copier, in this case the rotation of the photoconductor drum 1, the operation of the primary paper feed roll 15, the secondary paper feed rollers 16, 16a, the magnetic brush developer member 10, and the feed rolls in the fuser 18 (by linkage not shown) while at the same time providing an extremely simple means of ensuring that the exposure carriage 4 is smoothly but quickly accelerated into a constant speed "exposure" movement from right to left along the top of the copier as viewed in FIG. 1.

This smooth acceleration results as the drive member 25b of slow speed chain 1 moves from the '3 o'clock' position shown in FIGS. 2 and 4 to the '12 o'clock' position relative to the chain wheel 30 and simultaneously rides up along the slot 23' in the bracket 23. By the time the drive member 25b has reached the upper extent of its movement in the slot defined between the two triangular brackets and is at the '12 o'clock' position relative to the chain wheel 30 the carriage 4 will have attained its required constant linear velocity across the copier and the exposure operation can commence.

Similarly, the end of the "exposure" operation occurs at or just before arrival of the carriage 4 in a position where the drive member 25b of chain 21 arrives at the '12 o'clock' position. In passing from the '12 o'clock' position to the '9 o'clock' position around the chain wheel 28, the drive member 25b will drop downwardly and out of the slot 23' in the front bracket 23 and will, in doing so, have slowed down the carriage 4 to a standstill in a relatively short time when measured in terms of the total travel time of the carriage 4 from the FIGS. 2 and 4 position 4a to the FIG. 5 position 4b.

The chains 21 and 22 are carefully synchronised by the gears 41 and 42 so that the single drive member 26 of rear chain 22 is in the position illustrated in FIG. 5 simultaneously with disengagement of the drive member 25b of chain 21 from the slot 23' in the front bracket 23. Engagement of drive member 26 with the rear bracket 24 commences immediately and then allows the shortest possible dwell time at the end of the exposure cycle and before the return movement so that after a single copy cycle or at the end of a 'multiple copy' run, the carriage 4 will all the sooner be back in the full line position for substitution of a fresh original to be copied.

Then the "fast-return" chain 22, in moving in the reverse direction of circulation carries its drive member 26 in a rising travel from the '9 o'clock' position to the '12 o'clock' position into the slot 24' in the rear bracket 24 and will simultaneously accelerate the carriage 4 for movement in the rightward direction to attain very rapidly the desired constant fast-return movement from the FIG. 5 position 4b to the FIGS. 2 and 4 position 4a.

As the carriage 4 approaches the position 4a the drive member 26 of the "fast-return" chain will pass from the '12 o'clock' position to the '3 o'clock' position on chain wheel 31 and will, in so doing, leave the slot 24' in the rear bracket 24 after having arrested movement of the carriage 4.

During return movement of the carriage 4 from position 4b to position 4a, under the driving action of the drive member 26 of chain 22, the drive member 25b of chain 21 will have started its return travel to the chain wheel 30 'the long way round' via the toothed portion 32 of the photoconductor drum 1 and the bottom righthand front chain wheel 33.

By arranging the two drive members 25a and 25b on the slow speed chain 21 and a single drive member 26 on the high speed chain 22, it is possible to arrange that there is no time delay at the end of an exposure run, i.e., between disengagement of the drive member 25a or 25b from the slot 23' in the front bracket 23, of the carriage 4 and the engagement of the drive member 26 of high speed chain 22 in slot 24' of the rear bracket 24 of the carriage 4. Equally, at the end of the fast return run, as the drive member 26 of high speed chain 22 disengages from the slot 24' in the rear bracket 24, the other, 25a, of the two drive members carried by the slow speed chain 22 can simultaneously engage the slot 23' in the front bracket 23 so as to commence the next copy cycle without a pause.

Although the present invention is not intended to be limited to an arrangement in which two members 25a and 25b are carried on the slow speed chain with only a single member 26 on the high speed chain, the configuration shown in FIGS. 2 and 4 does by this means permit a slow forward stroke of the carriage 4 during exposure, followed immediately by a rapid return stroke which in turn is again followed by the next slow stroke if the chains are still circulating.

Thus, in the multiple-copy mode the two chains will circulate continuously so that the next exposure run of the carriage 4 from the FIGS. 2 and 4 position to the FIG. 5 position will follow immediately upon completion of the preceding fast return run from the FIG. 5 position to the FIGS. 2 and 4 position until the required number of exposures of the drum 1 has been made and the latent images produced by these exposures have been developed and transferred to paper and the image then cleaned from the drum.

This arrangement is particularly conveniently provided for by arranging the path lengths of the chains 21 and 22 and the circumference of the toothed portion 32 of the photoconductor drum 1 as follows.

Choosing an arbitrary unit of length E, the path length from the 3 o'clock position on the righthand chain wheels 30 or 31 to the 9 o'clock position on the lefthand chain wheels 28 or 29 is 3E. The circumference of the toothed portion 32 of the drum 1 is 4E. The total path length of the high speed chain 22 is 12E including the 3E portion during carriage movement. The return path length of the chain 21 is comprised of two sections, a first of length E between the 9 o'clock position on chain wheel 28 and the position referenced 25a in FIGS. 2 and 4, and a second section of length 4E from the position 25a in FIGS. 2 and 4, over the chain wheel 33 and the tensioning sprocket 34 and back to the 3 o'clock position on chain wheel 30.

This combination of dimensions provides that upon initiation of a copy cycle the drum 1 commences a constant speed rotational movement which terminates after exactly one revolution. Simultaneously with the start of the revolution the carriage 4 accelerates rapidly to execute a constant speed leftward "exposure" run such that the carriage comes to rest after the drive member 25b on slow speed chain 21 has moved along a distance 3E, i.e., after three quarters of the revolution of the drum 1. During the final quarter of the revolution of the drum 1 the drive member 25b on chain 21 moves to the 25a position in FIGS. 2 and 4 and the drive member 26 on high speed chain 22 simultaneously drives the carriage rightwardly back to the FIGS. 2 and 4 position on the "return" run.

In the multiple-copy mode the drum 32 will continue rotation and during the first three quarters of the next revolution the drive member 25a of slow speed chain 21 will move the carriage 4 leftwardly. During the last one quarter of that revolution the carriage will be driven rightwardly in a rapid return stroke under the influence of the drive member 26 of chain 22. This sequence continues until the end of the multiple-copy run.

In the single-copy mode, the two chains will be arrested immediately after the drum 1 has completed one revolution so that the next time the copy button is pressed, to initiate an exposure cycle, it will be the drive member 25a of the slow speed chain 21 which commences the exposure run and not the member 25b just described.

In this embodiment of the apparatus, the last quarter of the revolution of the drum 1 is necessary in order (a) to restore the drum to its starting position, and (b) to ensure development and transfer of the latent image the formation of which has just been completed at the end of the exposure run when the charged drum surface is exposed to the original. By the time that single revolution of the drum 1 is complete, the copy sheet will have passed through the transfer station between corona 17 and the drum 1, and will have cleared the fuser 18 to arrive at the delivery tray.

Although the chain path length during which the respective drive members will be in engagement with the brackets 23, 24 or 23', 24' of the carriage 4 is a distance 3E, it will be appreciated that because the drum 1 is rotating at a constant speed when the image is first exposed to the uniformly charged photoconductive surface of the drum, the exposure operation itself must occupy only that portion of the chain movement during which the carriage is moving at a constant velocity and therefore in which the chain 21 will be in a horizontal run. For this reason the dimension A denotes the maximum possible length of original which can be accommodated on the copier of FIG. 1.

The transitions from starting position to forward movement, from forward movement to rest at the end of the exposure stroke, from rest position to rearward movement and from rearward movement to starting position at the end of the return stroke are all smoothly engaged and without the need for any complex clutching mechanism whose timing requires careful adjustment. The entire operation of the copier is timed by the same two chains whose speed relationship will always be correctly maintained by means of the gearing 41 and 42.

Although the above description specifies that the drive systems employ chains 21 and 22, it will be understood that any other form of endless member may be employed provided it is capable of positive drive and the same close synchronising supervision of movement of the carriage 4 and preferably also of the various main components of the electrostatographic copier. For example, the endless member may comprise toothed belts carrying suitable projections for engagement in slots 23' and 24' in the exposure carriage brackets 23 and 24.

The endless member 21 driving the carriage 4 for its exposure run then may have any number of drive members including merely one member and not merely the two members in the illustrated embodiment.

We claim:

1. A document copier comprising a platen for supporting an original document to be copied, a scanning carriage mounted to move along a path to define a scan of an original on said platen; first and second endless driving members for driving said scanning carriage along said path; a pair of wheels entraining a respective one of said endless driving members to extend along a horizontal run parallel to said path of the scanning carriage; at least one drive member carried by each endless driving member; means on said scanning carriage defining two slots each adapted to receive a drive member carried by a respective one of said endless driving members; means driving said first endless driving member for constantly circulating motion giving travel along said horizontal run in a forward direction during a copy cycle; and means driving said second endless driving member simultaneously for constantly circulating motion at a speed higher than that of said first endless driving member and in a reverse direction during a copy cycle, said means defining slots on the scanning carriage each defining a slot whose length is such that each of the wheels at the ends of the said horizontal run of the respective one of said endless driving members has a radius shorter than the length of said slot.

2. A document copier according to claim 1, wherein said endless driving members each comprise at least one transmission chain each carrying appropriate drive members to engage said slots defined on the carriage.

3. A document copier according to claim 1, wherein said copier includes a photoconductor drum and said first endless driving member is synchronised with the rotation of said photoconductor drum to have the same peripheral speed as said photoconductor drum.

4. A document copier according to claim 1, and incorporating means for maintaining constant tension in the two endless driving members throughout use of the copier.

5. A document copier according to claim 1, wherein said scanning carriage includes means for supporting a document to be scanned by a stationary light source past which the document supporting means moves.

6. A document copier according to claim 1, wherein said copier includes an image-developer unit, a secondary sheet feed and a primary sheet feed, wherein there are rotary drive members for said image-developer unit, said secondary feed and said primary feed; and wherein said second endless driving member is in constant engagement with said rotary drive members.

7. A document copier according to claim 1, wherein said endless driving members are synchronised for rotation such that, each time a drive member carried by said first endless driving member arrives at the end of a scan stroke, that drive member is withdrawn from the associated slot defined on the scanning carriage while at the same time a drive member of said second endless driving member enters its associated slot to commence a return stroke.

8. A document copier according to claim 7, wherein said first endless driving member has to drive members at diametrically opposite points thereon, and the said second endless driving member has a single drive member.

9. A document copier according to claim 8, wherein said second endless driving member has a length 1.5 times that of the said first endless driving member.

10. A document copier according to claim 7, wherein (a) said copier has a photoconductor drum, (b) said first endless driving member is synchronised with the rotation of said photoconductor drum, (c) said photoconductor drum has a circumference of 4E, where E is an arbitrary length, (d) the path length of each drive member between extreme positions at the ends of the horizontal run of each endless driving member between the starting position and the finishing position of a scan movement of said scanning carriage is 3E, (e) said first endless member has an arcuate path portion having the same radius of curvature and centre of curvature as said photoconductor drum, (f) the path length of the said first endless driving member from said finishing position of a scan movement to the start of said arcuate path portion is (E), and (g) the return path length of the said first endless driving member from the start of its arcuate path portion to the extreme position of the drive member carried thereby, at the start of the scan movement is 4E.

11. A document copier according to claim 10, wherein the said second endless driving member has a speed of circulation which is three times that of the said first endless driving member.

* * * * *